(12) United States Patent
Schnittger et al.

(10) Patent No.: US 12,097,828 B2
(45) Date of Patent: Sep. 24, 2024

(54) PARKING BRAKE DEVICE FOR A MOTOR VEHICLE

(71) Applicant: Knorr-Bremse Systeme fuer Nutzfahrzeuge GmbH, Munich (DE)

(72) Inventors: Karsten Schnittger, Munich (DE); Fabian Griesser, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 869 days.

(21) Appl. No.: 17/254,130

(22) PCT Filed: Jun. 18, 2019

(86) PCT No.: PCT/EP2019/065938
§ 371 (c)(1),
(2) Date: Dec. 18, 2020

(87) PCT Pub. No.: WO2019/243285
PCT Pub. Date: Dec. 26, 2019

(65) Prior Publication Data
US 2021/0269008 A1 Sep. 2, 2021

(30) Foreign Application Priority Data
Jun. 19, 2018 (DE) .......................... 102018114639.6

(51) Int. Cl.
*B60T 13/38* (2006.01)
*B60T 7/20* (2006.01)
*B60T 13/68* (2006.01)

(52) U.S. Cl.
CPC .............. *B60T 13/683* (2013.01); *B60T 7/20* (2013.01)

(58) Field of Classification Search
CPC ...... B60T 8/1708; B60T 8/323; B60T 13/263; B60T 13/385; B60T 13/683; B60T 7/20
See application file for complete search history.

(56) References Cited

U.S. PATENT DOCUMENTS 10,780,871 B2 * 9/2020 Riley .................... B60T 15/027
10,946,848 B2 * 3/2021 Van Thiel ............. B60T 13/683
(Continued)

FOREIGN PATENT DOCUMENTS

DE  10 2006 041 011 A1   3/2008
DE  10 2008 048 207 A1   6/2010
(Continued)

OTHER PUBLICATIONS

International Search Report (PCT/ISA/210) issued in PCT Application No. PCT/EP2019/065938 dated Oct. 16, 2019 with English translation (six (6) pages).
(Continued)

*Primary Examiner* — Bradley T King
(74) *Attorney, Agent, or Firm* — Crowell & Moring LLP

(57) ABSTRACT

A parking brake device for a motor vehicle, in particular a utility vehicle, includes at least one compressed air connection, at least one first control solenoid valve unit, at least one trailer control bistable valve, and at least one first compressed air outlet. The compressed air connection is connectable to the first control solenoid valve unit and the trailer control bistable valve. The first control solenoid valve is connectable to the trailer control bistable valve via at least one first control line. The trailer control bistable valve is connectable to the first compressed air outlet via at least one trailer control outlet line. The parking brake device has at least one towing vehicle control bistable valve and at least one second compressed air outlet. The compressed air connection is connectable to the towing vehicle control bistable valve. The towing vehicle control bistable valve is connectable to the second compressed air outlet via at least one towing vehicle control outlet line. At least one towing vehicle outlet branch is arranged in the towing vehicle control outlet line between the towing vehicle control (Continued)

bistable valve and the second compressed air outlet. The first control solenoid valve unit is connectable to the towing vehicle control outlet line via at least one bypass control line and via the towing vehicle control outlet branch.

14 Claims, 2 Drawing Sheets

(56) References Cited

U.S. PATENT DOCUMENTS

| | | | |
|---|---|---|---|
| 11,440,521 B2* | 9/2022 | Van Thiel | B60T 15/043 |
| 2005/0137767 A1 | 6/2005 | Goebels et al. | |
| 2010/0078988 A1 | 4/2010 | Bensch et al. | |
| 2014/0103237 A1* | 4/2014 | Herges | B60T 17/221 |
| | | | 251/129.01 |
| 2018/0251111 A1 | 9/2018 | Schnittger et al. | |
| 2018/0251112 A1 | 9/2018 | Griesser et al. | |
| 2021/0245723 A1* | 8/2021 | Schnittger | B60T 13/683 |
| 2022/0258712 A1* | 8/2022 | Schnittger | B60T 13/683 |

FOREIGN PATENT DOCUMENTS

| | | |
|---|---|---|
| DE | 10 2015 119 135 A1 | 5/2017 |
| DE | 10 2015 119 136 A1 | 5/2017 |
| EP | 3 129 264 B1 | 4/2018 |
| EP | 3 359 432 B1 | 5/2020 |
| GB | 2 270 130 A | 3/1994 |
| WO | WO 2015/154787 A1 | 10/2015 |
| WO | WO 2017/060128 A1 | 4/2017 |

OTHER PUBLICATIONS

German-language Written Opinion (PCT/ISA/237) issued in PCT Application No. PCT/EP2019/065938 dated Oct. 16, 2019 (six (6) pages).

* cited by examiner

PARKING BRAKE DEVICE FOR A MOTOR VEHICLE

BACKGROUND AND SUMMARY OF THE INVENTION

The present invention relates to a parking brake device for a motor vehicle, in particular a utility vehicle, having at least one compressed air port, having at least one first control solenoid valve unit, having at least one trailer control bistable valve and having at least one first compressed air outlet.

Parking brakes (also referred to as handbrakes) of utility vehicles, including trailers and rail vehicles, are nowadays generally equipped with spring-loaded brake cylinders which in the release position apply compressed air to a spring compression space and as a result keep the spring tensioned, while for parking braking the spring compression space is vented, i.e. is connected to atmospheric pressure, so that the brake cylinder generates a braking force under the effect of the spring (cf. Bosch, Kraftfahrtechnisches Taschenbuch [Automotive Handbook], $22^{nd}$ edition, Düsseldorf, 1995, p. 648).

WO 2015/154 787 A1 has already disclosed an electronic parking brake which uses a relay valve whose piston is embodied as a stepped piston and has a feedback of the relay valve outlet to the control space of the relay valve. A throttle unit is provided in the feedback path. However, a loss of compressed air occurs in particular when the device is vented using the feedback to the throttle unit. An adjustment is necessary, wherein solenoid valves have to be correspondingly switched for aerating and venting.

It is therefore the object of the present invention to develop in an advantageous way a parking brake device of the type mentioned at the beginning, in particular to the effect that a parking brake device can be of comparatively simple design and can be aerated and vented in a comparatively controlled fashion.

This object is achieved according to the invention by means of a parking brake device for motor vehicles having the features of the independent claim. Accordingly, a parking brake device for a motor vehicle, in particular a utility vehicle, having at least one compressed air port, having at least one first control solenoid valve unit, having at least one trailer control bistable valve and having at least one first compressed air outlet is provided, wherein the compressed air port can be connected to the first control solenoid valve unit and to the trailer control bistable valve, wherein the first control solenoid valve unit can be connected to the trailer control bistable valve via at least one first control line, and wherein the trailer control bistable valve can be connected to the first compressed air outlet via at least one trailer control outlet line, wherein the parking brake device has at least one tractor vehicle control bistable valve and at least one second compressed air outlet, wherein the compressed air port can be connected to the tractor vehicle control bistable valve, and wherein the tractor vehicle control bistable valve can be connected to the second compressed air outlet via at least one tractor vehicle control outlet line, wherein at least one tractor vehicle outlet branch is arranged in the tractor vehicle control outlet line, between the tractor vehicle control bistable valve and the second compressed air outlet, and wherein the first control solenoid valve unit can be connected to the tractor vehicle control outlet line via at least one bypass control line and via the tractor vehicle outlet branch.

The invention is based on the basic concept that the tractor vehicle control outlet line and the trailer control outlet line can be connected to one another via the bypass control line and the first control solenoid valve unit.

By means of this type of connection, which can be made and disconnected by means of the first control solenoid valve unit, the control pressure of the tractor vehicle control outlet line can also be transmitted to the trailer control outlet line. The same operating pressure or control pressure in these two outlet lines is particularly advantageously suitable for operating the parking brake device, e.g. with respect to a stepped braking action of a tractor vehicle and of a trailer. As soon as a stepped braking action is to be carried out, the first control solenoid valve unit switches into an open position so that the two outlet lines are connected. Therefore, an operating pressure which is closed-loop controlled and therefore can be graduated and which originates from the tractor vehicle control outlet line, can also be transmitted or applied to the trailer control outlet line. Consequently, the control pressure for both outlet lines as described above can be open-loop or closed-loop controlled with just one control solenoid valve unit, which causes the parking brake device according to the invention to be simplified in respect of installation space, weight, manufacture, mounting etc.

Consequently there can be provision that the bypass control line is connected to the tractor vehicle control outlet line downstream of the tractor vehicle control bistable valve. Such a connection of the bypass control line to the tractor vehicle control outlet line downstream of the tractor vehicle control bistable valve is referred, in particular, to an at least partially aerated or pressurized state of the tractor vehicle control bistable valve and of the tractor vehicle control outlet line. In other words, this connection of the bypass control line downstream of the tractor vehicle control bistable valve into the tractor vehicle control outlet line is not referred to an at least partially vented state of the tractor vehicle control bistable valve and of the tractor vehicle control outlet line.

In this context, it is also contemplated that the abovementioned parking brake device can have a first and a second parking brake unit. In particular, the first parking brake unit of the parking brake device can be provided for a trailer of a motor vehicle, wherein the second parking brake unit can be provided for a tractor vehicle.

In addition, the first control line is connected to the trailer control outlet line via at least one first feedback line, so that the trailer control outlet line can also be connected to the tractor vehicle control outlet line via the first control line and the first feedback line.

According to one embodiment according to the invention, in addition at least one first control branch is arranged in the first control line, between the trailer control bistable valve and the first control solenoid valve unit, and at least one trailer outlet branch is arranged in the trailer control outlet line, between the trailer control bistable valve and the first compressed air outlet, and wherein the first control line is connected to the trailer control outlet line at the first control branch via at least one first feedback line at the trailer outlet branch.

This type of pneumatic connection permits, in particular, a simplified design of the trailer control bistable valve, since said valve can be bypassed by means of the feedback line and the corresponding branches if the two outlet lines described above are to be connected to one another. As a result, the operating pressure of the trailer control outlet line can be transmitted directly, and without the intermediate connection of the trailer control bistable valve, to the first control line from where this pressure can also be transmitted to the tractor vehicle control outlet line by means of the first control solenoid valve unit and the bypass control line.

A currentless switched state can always be ensured by means of electromagnetically switchable, spring-loaded control valves or valve units, in particular as soon as a switched state which is brought about in a targeted form (e.g. by electromagnetic switching) is terminated.

The trailer control bistable valve preferably has an inlet, an outlet or working outlet, a control inlet and a venting outlet. The first control line is connected to the trailer control bistable valve via the control inlet. The compressed air source is also connected to the inlet of the trailer control bistable valve. The outlet or working outlet of the trailer control bistable valve is or can be preferably connected to at least one control inlet of at least one trailer control valve known from the prior art, via the trailer control outlet line.

Since a specific pressure is applied to the control inlet of the trailer control bistable valve, a connection can be established and controlled between the inlet and the outlet or working outlet of the trailer control bistable valve.

This specific pressure does not have to be the same as or higher than a threshold pressure in order to be able to provide a connection between the inlet and outlet of the trailer control bistable valve. When the threshold pressure is reached, the venting outlet of the trailer control bistable valve is closed.

A compressed air connection between the inlet and the outlet of the trailer control bistable valve can be controlled as required by means of air pressures or fluid pressures which are at least the same as or higher than the predeterminable threshold pressure. In this way a specific pressure can advantageously be obtained at the outlet or the working outlet of the trailer control bistable valve.

In addition there can be provision that at least one first throttle unit is arranged in the trailer control outlet line, in particular wherein the first throttle unit can be arranged between the trailer control bistable valve and the trailer outlet branch, and/or wherein the first throttle unit can be arranged in the first feedback line.

By means of such a first throttle unit and in its corresponding arrangement between the trailer control bistable valve and the trailer outlet branch it is possible to aerate the relatively small volume of the trailer control outlet line quickly, safely and efficiently.

According to the invention it is also contemplated that the first throttle unit is arranged in the first feedback line between the trailer outlet branch of the trailer control outlet line and the first control branch of the first control line.

By means of the arrangement of the first throttle unit in the first feedback line it is possible, in particular, to prevent or reduce a loss of air in the course of a switching process between different operating modes of a motor vehicle with the parking brake device according to the invention. A switching process between the operating states can be carried out more quickly, efficiently and precisely. In particular, as a result of the prevention or the limitation of a loss of air there is no need to adjust the compressed air.

A driving state, at least a parked state, a braking state which can be graduated or a trailer test state can be provided as operating modes of the parking brake device for the motor vehicle.

For the braking state which can be graduated, a constant pressure according to demand can be set at the outlet of the trailer control bistable valve in order to achieve any desired braking effect.

A constant pressure according to the invention can also be understood to be a pressure range with a maximum pressure and minimum pressure which can be open-loop or closed-loop controlled, preferably predefined.

In particular, the pressure can be between 0 bar and the maximum system pressure.

A constant pressure or pressure range can be set or maintained in particular for certain times according to the present invention.

A pressure which is preferably proportional to the pressure at the control inlet of the trailer control bistable valve can be provided at the outlet of the trailer control bistable valve.

Alternatively, an anti-jack-knife braking state can furthermore be provided by means of the parking brake device according to the invention. It is therefore possible to extend the motor vehicle (equipped e.g. with a tractor vehicle and a trailer) by preferably braking the trailer in a way which can be graduated, and in this way the motor vehicle can be stabilized.

In this way a parking brake and a service brake of the tractor vehicle can preferably be released in the anti-jack-knife state, wherein a parking brake and/or service brake, preferably at least one spring-loaded brake cylinder and/or service brake cylinder, of the trailer is activated, in particular activated in a way which can be graduated.

In this way, a motor vehicle, in particular a utility vehicle, is to be understood as preferably being a tractor vehicle with at least one trailer.

The switching between e.g. a driving state, a parked state or a braking state which can be graduated can be carried out more quickly and in a more controlled fashion in particular by means the parking brake device according to the invention.

In addition it is contemplated that the first control solenoid valve unit has at least one first control solenoid valve and at least one second control solenoid valve, in particular wherein at least one pressure sensor is arranged in a connecting line between the first and second control solenoid valves.

In this context, it is also contemplated that the first control solenoid valve unit is configured in such a way that the first control solenoid valve is arranged between the compressed air port and the first control line, and the second control solenoid valve is arranged between the first control line and the bypass control line.

The first control line therefore connects the trailer control bistable valve to the preferably independent first control solenoid valve and to the independent second control solenoid valve within the first control solenoid valve unit. For this purpose, the first control line is preferably connected at a further control branch to a connecting line which connects the first and second control solenoid valves to one another.

Targeted aeration and venting of the control inlet of the trailer control bistable valve can therefore be achieved by means of the first control solenoid valve. In addition, targeted aeration and venting of the trailer control outlet line can be provided by means of the second control solenoid valve.

Alternatively there can be provision that the first control solenoid valve unit is configured as a combined solenoid valve unit comprising the first control solenoid valve and the second control solenoid valve with a bypass control port for connection to the bypass control line.

Furthermore, it is contemplated that the first feedback line forms, in conjunction with the first control branch and the trailer outlet branch, a feedback connection between a first control inlet and a first outlet of the trailer control bistable valve.

It is therefore possible to use a pressure from the outlet or working outlet of the trailer control bistable valve to control its own control inlet as necessary.

In particular, a connection can be obtained between the inlet and the outlet of the bistable valve by virtue of the fact that the pressure at the outlet of the bistable valve can be fed back to the control inlet of the bistable valve. Moreover, the feedback of the operating pressure at the outlet of the trailer control bistable valve to its own control inlet permits a shortened switching period or energization period of the first control solenoid valve unit, since after a sufficiently high threshold control pressure is obtained at the control inlet of the trailer control bistable valve, the first control solenoid valve unit can be converted back into the currentless state.

The parking brake device can also have at least one second control solenoid valve unit which can be connected to the compressed air port and the tractor vehicle control bistable valve, wherein the second control solenoid valve unit can be connected to the tractor vehicle control bistable valve via at least one second control line.

This type of pneumatic connection also permits a simplified design of the tractor vehicle control bistable valve in a structural and functional way which is comparable to the trailer control bistable valve, since said tractor vehicle control bistable valve can also be bypassed by means of the second feedback line. The bypassing is carried out, in particular, when the operating pressure of the tractor vehicle control outlet line is to be transmitted directly to the second control line without intermediate connection of the tractor vehicle control bistable valve and is to be capable of being controlled by means of the second control solenoid valve unit. Such bypassed control can be achieved, for example, by stepped venting of the tractor vehicle control outlet line by means of the second control solenoid valve unit.

The tractor vehicle control bistable valve also has (comparable with the trailer control bistable valve) an inlet, an outlet or working outlet, a control inlet and a venting outlet. The second control line is connected to the tractor vehicle control bistable valve via the second control inlet. The compressed air source is connected to the inlet of the tractor vehicle control bistable valve. The outlet or working outlet of the tractor vehicle control bistable valve is or can be preferably connected to at least one spring-loaded brake cylinder of the tractor vehicle via the tractor vehicle control outlet line.

By virtue of the fact that a specific operating pressure is applied to the control inlet of the tractor vehicle control bistable valve in accordance with an open position of the second control solenoid valve unit, a connection can be established and controlled between the inlet and the outlet or working outlet of the tractor vehicle control bistable valve.

This specific pressure must be the same as or higher than a threshold pressure in order to be able to provide a connection between the inlet and outlet of the tractor vehicle control bistable valve. When the threshold pressure is reached, the venting outlet of the tractor vehicle control bistable valve is closed.

A compressed air connection between the inlet and the outlet of the tractor vehicle control bistable valve can be controlled as required by means of air pressures or fluid pressures which are at least the same as or higher than the predeterminable threshold pressure. In this way a specific pressure can advantageously be achieved at the outlet or working outlet of the tractor vehicle control bistable valve.

There can also be provision that at least a second control branch is arranged in the second control line, between the tractor vehicle control bistable valve and the second control solenoid valve unit, wherein the second control line is connected to the tractor vehicle control outlet line at the second control branch, via at least one second feedback line at the tractor vehicle outlet branch.

It is consequently possible that the second feedback line forms, in conjunction with the second control branch and the tractor vehicle outlet branch, a feedback connection via the second throttle unit, between a control inlet and an outlet of the tractor vehicle control bistable valve.

There is a continuous connection between the outlet or working outlet of the tractor vehicle control bistable valve and its control inlet by means of the feedback line.

As soon as the control inlet of the tractor vehicle control bistable valve is aerated with a sufficient air pressure, the compressed air can be provided to the outlet of the tractor vehicle control bistable valve via a connection between the inlet and the outlet of this bistable valve.

The sufficient air pressure is based here on a preferably predefinable threshold pressure of the tractor vehicle control bistable valve.

It is then no longer absolutely necessary to feed additional compressed air to the second control inlet of the tractor vehicle control bistable valve via the second control solenoid valve unit in order to keep the operation of the tractor vehicle control bistable valve stable.

The functionality of the tractor vehicle control bistable valve therefore corresponds essentially to the functionality of the trailer control bistable valve.

In addition, the parking brake device has at least one second throttle unit which is arranged in the second feedback line, in particular between the tractor vehicle outlet branch of the tractor vehicle control outlet line and the second control branch of the second control line.

The second throttle unit is connected to the tractor vehicle control bistable valve, in particular via the second feedback line, the second control branch and the second control line.

Furthermore, the second feedback line is connected to the second control solenoid valve unit via the second control line. In this way it is possible to control a venting or aeration of at least one spring-loaded brake cylinder of the tractor vehicle as required and with a high level of accuracy and if appropriate disables a venting or aeration.

In particular, a loss of air in the course of a switching process between different operating modes of a motor vehicle can be avoided or reduced with the parking brake device according to the invention by means of the second throttle unit in the second feedback line. A switching process between the operating states can therefore be carried out more quickly, more efficiently and more precisely. In particular, as a result of the prevention or reduction of a loss of air, there is no need to adjust compressed air.

Additionally or alternatively it is also contemplated that the second throttle unit is arranged in the first tractor vehicle control outlet line downstream of the tractor vehicle control bistable valve and upstream of the tractor vehicle outlet branch.

Additionally it is contemplated that the second control solenoid valve unit has at least one third control solenoid valve and at least one venting solenoid valve with at least one venting outlet.

In this context there is preferably provision that the second control solenoid valve unit is configured in such a way that the third control solenoid valve is arranged between the compressed air port and the second control line, and the venting solenoid valve is arranged between the second control line and the venting outlet.

In this way, the venting solenoid valve can therefore have the venting outlet.

The second control line accordingly connects the tractor vehicle control bistable valve at a further control branch to a connecting line of the preferably autonomously third control solenoid valve and the independent venting solenoid valve within the second control solenoid valve unit.

Alternatively there can be provision that the second control solenoid valve unit is embodied as a combined solenoid valve unit comprising the third control solenoid valve and the venting solenoid valve with the venting outlet.

Targeted controllability of the volumes within the parking brake device can therefore be achieved, in particular for aerating and venting the control inlet of the tractor vehicle control bistable valve.

It is also contemplated that the second feedback line forms, in conjunction with the second control branch and the tractor vehicle outlet branch, a feedback connection, via the second throttle unit, between a control inlet and an outlet of the tractor vehicle control bistable valve.

However, in this context it is also possible that the second feedback line forms, in conjunction with second control branch and the tractor vehicle outlet branch, a feedback connection between a control inlet and an outlet of the tractor vehicle control bistable valve.

Therefore, a pressure from the pressurized or aerated outlet or working outlet of the tractor vehicle control bistable valve can be used as required to control its own control inlet.

Moreover, the feedback of the operating pressure at the outlet of the tractor vehicle control bistable valve to its own control inlet permits a shortened switching period or energization period of the second control solenoid valve unit, since after a sufficiently high threshold control pressure has been reached at the control inlet of the tractor vehicle control bistable valve the second control solenoid valve unit can be converted back into the currentless state.

A currentless switched state can therefore always be ensured by means of electromagnetically switchable, spring-loaded valves, in particular as soon as a switch state which is brought about in a targeted form, e.g. by electromagnetic switching, is terminated.

Furthermore there can be provision that the tractor vehicle control bistable valve is embodied as a tractor vehicle control relay valve, and/or the trailer control bistable valve is embodied as a trailer control relay valve or as a 3/2-way valve which can be actuated pneumatically.

If the trailer control bistable valve and tractor vehicle control bistable valve are each embodied as a relay valve, a pressure which is preferably proportional to the pressure at the control inlet of the trailer control bistable valve and tractor vehicle control bistable valve can be provided at the outlet or working outlet of the trailer control bistable valve and tractor vehicle control bistable valve. By virtue of such a proportional actuation capability of the trailer control bistable valve and tractor vehicle control bistable valve in the form of a relay valve it is possible to achieve very precise, efficient and safe actuation of the tractor vehicle brake and of the trailer brake.

However, in the case of the trailer control bistable valve it is also possible to provide the use of a 3/2-way valve which can be fed back as sufficient. This is because the compressed air volumes for actuating a control inlet of a trailer control valve are significantly smaller than the comparable compressed air volumes, which have to be controlled, of the service brake cylinders and/or spring-loaded brake cylinders of the tractor vehicle, which cylinders have to be controlled downstream of the tractor vehicle bistable valve. Accordingly the provision of the 3/2-way valve provides a structural simplification of the parking brake device according to the invention, as result of which said parking brake device is more favorable to manufacture, operate and service.

The parking brake device described above is preferably also provided for controlling at least one spring-loaded brake cylinder and/or at least one service brake cylinder of the trailer. Therefore, open-loop and/or closed-loop control of a parking brake of the trailer can be carried out by means of the trailer control bistable valve or relay valve.

In this way, the parking brake device can have a trailer control outlet as the first compressed air outlet, which is connected to the outlet or working outlet of the trailer control bistable valve via the trailer control outlet line.

The parking brake device therefore provides a device for actuating the brake systems of a motor vehicle, in particular of a tractor vehicle and of a trailer, as necessary.

Furthermore, the first control solenoid valve unit can be configured with the first control solenoid valve and the second control solenoid valve in such a way that the first control solenoid valve is provided in conjunction with the first control line, and the second control solenoid valve is provided between the first control line and the bypass control line.

Therefore, the first control line connects the trailer control bistable valve to the corresponding further control branch of the connecting line of the preferably independent first control solenoid valve and of the independent second control solenoid valve within the first control solenoid valve unit. The further control branch is arranged here in the connecting line between the first control solenoid valve and the second control solenoid valve.

The parking brake device described above is preferably also provided for providing a service brake outlet and a spring-loaded brake cylinder outlet for a tractor vehicle. The second compressed air outlet can have, in particular, two separate compressed air outlets in the form of the service brake outlet and the spring-loaded brake cylinder outlet. The service brake and the parking brake of a tractor vehicle can therefore be expediently aerated and vented.

The parking brake device can also preferably have an, in particular, pressure-controlled alternating nonreturn valve which is connected to the service brake outlet and the spring-loaded brake cylinder outlet as well as the outlet of the tractor vehicle control bistable valve.

The alternating nonreturn valve is preferably provided as what is referred to as a select high valve.

In particular there can also be provision that the first and second control solenoid valve units can be controlled autonomously of one another. The tractor vehicle and the trailer can therefore be actuated autonomously and independently of one another and to apply a braking effect as required.

Targeted controllability of the volumes within the parking brake device can therefore be achieved, in particular for aerating and venting the control inlets of the trailer control bistable valve and tractor vehicle control bistable valve.

Moreover, it is possible that the first and second control solenoid valves are provided as solenoid valves which are closed in a currentless state or pneumatically blocked. Aeration or venting of the trailer control bistable valve and tractor vehicle control bistable valve is therefore necessary only to switch over the operating states of the parking brake device according to the invention.

Consequently, an operating state, in particular a driving state or a parked state can preferably be implemented, wherein the first, second and third control solenoid valves and the venting valve are closed in a currentless state.

Further details and advantages of the invention will now be explained on the basis of the exemplary embodiments illustrated in more detail in the drawings.

DETAILED DESCRIPTION OF THE DRAWINGS

Figure 1:
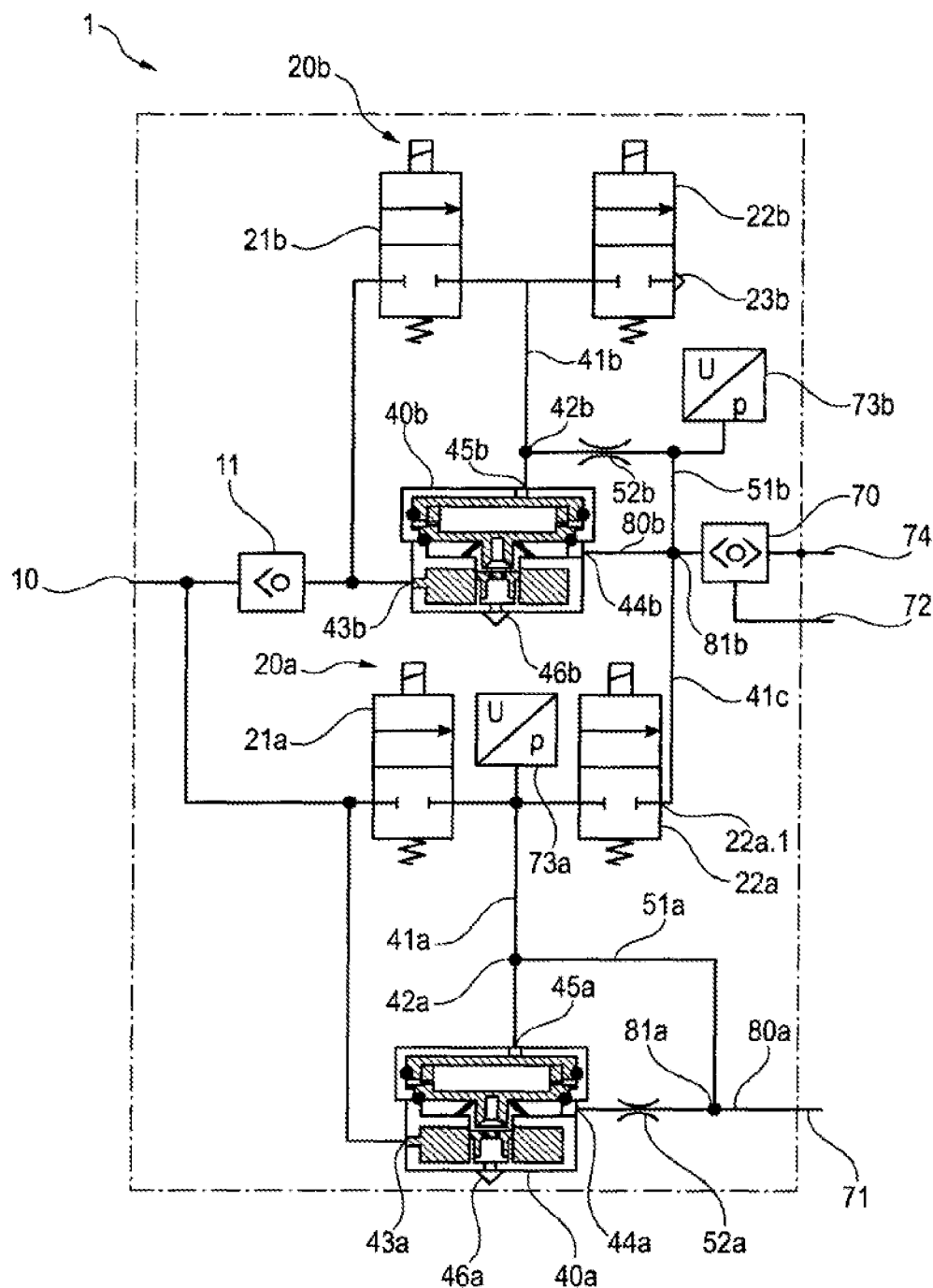
FIG. 1 shows a first exemplary embodiment of a parking brake device according to the invention in a parked state.

FIG. 1 shows a schematic illustration of a parking brake device 1 for a motor vehicle, here a utility vehicle.

The parking brake device 1 has a compressed air port 10 and a first control solenoid valve unit 20a and a trailer control bistable valve 40a for a trailer.

The trailer control bistable valve 40a is embodied as a trailer control relay valve 40a.

The trailer control relay valve 40a is provided with an inlet 43a, with an outlet or working outlet 44a, a control inlet 45a and a venting outlet 46a.

The compressed air port 10 is connected to the inlet 43a of the trailer control relay valve 40a.

The trailer control relay valve 40a constitutes a bistable element.

Various operating states of the parking brake device 1 for a trailer or its trailer control valve, in particular a first and a second parked state, a driving state and a graduated braking state, can be modelled in the form of air pressures as a function of the pressure at the control inlet 45a of the trailer control relay valve 40a, at its outlet 44a.

Furthermore, an anti-jack-knife braking state can also be provided in the sense of the first exemplary embodiment according to FIG. 1.

In particular, in FIG. 1 the exemplary embodiment is illustrated in a first parked state.

The first control solenoid valve unit 20a is also provided with a first control solenoid valve 21a and a second control solenoid valve 22a.

The first control solenoid valve 21a and the second control solenoid valve 22a are provided as 2/2-way valves which can be electrically activated or actuated.

The first control solenoid valve 21a is configured to be closed in the currentless state.

The second control solenoid valve 22a is configured to be closed in the currentless state.

The compressed air port 10 is connected to the first control solenoid valve unit 20a, in particular to the first control solenoid valve 21a.

The compressed air port 10 is represented here by a compressed air source (not illustrated in more detail) and a nonreturn valve 11 which is shown.

Furthermore, the parking brake device 1 is provided with a first control line 41a.

The first control line 41a is connected to the first control solenoid valve unit 20a in such a way that the first control solenoid valve 21a and the second control solenoid valve 22a are connected to the first control line 41a independently of one another.

The first control line 41 is connected to the control inlet 45a of the trailer control relay valve 40a.

A pneumatic connection is therefore available between the first control solenoid valve unit 20a and the first control inlet 45a of the trailer control relay valve 40a. The first control line 41a has a first control branch 42a upstream of the trailer control relay valve 40a.

Furthermore, the parking brake device 1 has a first feedback line 51a.

The first feedback line 51a is connected to the first control line 41a via the first control branch 42a.

Furthermore, the first feedback line 51a is connected to a trailer control outlet line 80a via a trailer outlet branch 81a.

Accordingly, a feedback connection is present between the control inlet 45a and the working outlet 44a of the trailer control relay valve 40a via the first feedback line 51a.

The first feedback line 51a is therefore connected to the outlet or working outlet 44a of the trailer control relay valve 40a via the trailer outlet branch 81a.

In this way, the first feedback line 51a forms a feedback connection between the outlet 44a and the control inlet 45a of the trailer control relay valve 40.

The parking brake device 1 also has a first compressed air outlet 71 in the form of a trailer control outlet 71.

According to FIG. 1, compressed air can be directed from the outlet 44a of the trailer control relay valve 40a to the trailer control outlet 71 via the trailer control outlet line 80a.

Starting from the trailer control outlet 71, the compressed air can preferably be fed to a control inlet of a trailer control valve (not shown in FIG. 1) for controlling one or more spring-loaded brake cylinders of the trailer.

According to the present invention, there is generally preferably provision that a first throttle unit 52a is arranged in the trailer control outlet line 80a, between the outlet 44a of the trailer control relay valve 40a and the trailer outlet branch 81a.

In addition, according to the present invention there is additionally or alternatively provision that a further throttle unit is arranged along the first feedback line 51a, between the first control branch 42a of the first control line 41a and the trailer outlet branch 81a of the trailer control outlet line 80a.

The fluid pressure or air pressure at the outlet 44a of the trailer control relay valve 40a can be set and open-loop and closed-loop controlled in a targeted fashion by means of the first feedback line 51a with the first throttle unit 52a.

Moreover, a first pressure sensor 73a can be arranged in a connecting line between the first and second control solenoid valves 21a, 22a.

Therefore, the air pressure or fluid pressure at the control inlet 45a of the trailer control relay valve 40a can be detected and open-loop and/or closed-loop controlled in a targeted fashion.

Furthermore, a tractor vehicle control bistable valve 40b and a second control solenoid valve unit 20b of the parking brake device 1 are shown in FIG. 1.

The tractor vehicle control bistable valve 40b is embodied as a tractor vehicle control relay valve 40b.

The second control solenoid valve unit 20b is shown with a third control solenoid valve 21b, a venting valve or venting solenoid valve 22b and a venting outlet 23b.

The venting outlet 23b can be present integrated into the venting solenoid valve 22b according to FIG. 1.

The third control solenoid valve 21b is accordingly configured in a way comparable to the first control solenoid valve 21a.

The third control solenoid valve 21b and the tractor vehicle control relay valve 40b are preferably connected to the compressed air port 10.

Alternatively there can also be provision that the third control solenoid valve 21b and the tractor vehicle control relay valve 40b are connected to a separate, second compressed air port, which is embodied in a way essentially comparable to the compressed air port 10 described above.

The second compressed air port (not shown in FIG. 1) can therefore also be embodied by means of a compressed air source (not illustrated in more detail) and a second nonreturn valve.

Furthermore, the parking brake device 1 has a second control line 41b according to FIG. 1.

The second control solenoid valve unit 20b and the tractor vehicle control relay valve 40b are connected to one another via the second control line 41b.

Like the trailer control relay valve 40a, the tractor vehicle control relay valve 40b has an inlet 43b, an outlet 44b, a control inlet 45b and a venting outlet 46b.

The second control line 41b is connected to the control inlet 45b of the tractor vehicle control relay valve 40b.

The method of functioning of the trailer control relay valve 40a and tractor vehicle control relay valve 40b is preferably identical and comparable.

A second control branch 42b is provided upstream of the tractor vehicle control relay valve 40b in the second control line 41b.

Moreover, the parking brake device 1 has a second feedback line 51b which is connected to the second control line 41b via the second control branch 42b.

The second feedback line 51b is connected to a tractor vehicle control outlet line 80b via a tractor vehicle outlet branch 81b.

The tractor vehicle control outlet line 80b is connected to the outlet 44b of the tractor vehicle control relay valve 40b.

The second feedback line 51b therefore forms a feedback from the outlet 44b of the tractor vehicle control relay valve 40b to the control inlet 45b of the tractor vehicle control relay valve 40b via the tractor vehicle control outlet line 80b, the tractor vehicle outlet branch 81b, the second control branch 42b and the control line 41b.

A second throttle unit 52b is arranged in the second feedback line 51b, between the tractor vehicle outlet branch 81b of the tractor vehicle control outlet line 80b and the second control branch 42b of the second control line 41b.

Therefore, by virtue of the second feedback line 51b and the second throttle unit 52b, an, in particular throttled, feedback is continuously present between the outlet 44b and the controlled inlet 45b of the tractor vehicle control relay valve 40b.

Moreover, a second pressure sensor 73b can be arranged in the second feedback line 51b of the tractor vehicle control relay valve 40b.

Therefore, the air pressure or fluid pressure at the outlet 44b of the tractor vehicle control relay valve 40b can be detected and open-loop and/or closed-loop controlled in a targeted fashion.

According to FIG. 1, compressed air can be passed on from the outlet 44b of the tractor vehicle control relay valve 40b, along the tractor vehicle control outlet line 80b via the select high valve 70 to a second compressed air outlet 72 in the form of a spring-loaded brake cylinder outlet 72 for the tractor vehicle of a utility vehicle.

The select high valve 70 is connected via the tractor vehicle control outlet line 80b to the second feedback line 51b, the spring-loaded brake cylinder outlet 72 and further compressed air outlet 74, embodied as a service brake outlet 74 for a tractor vehicle.

The spring-loaded brake cylinder outlet 72 and the service brake outlet 74 constitute in this way compressed air outlets for one or more spring-loaded brake cylinders of the parking brake or for one or more service brake cylinders of the service brake.

The switching behavior of the select high valve 70 follows the primary pressure gradient present.

Therefore, the spring-loaded brake cylinder outlet 72 is aerated with a high pressure of the outlet 44b of the tractor vehicle control relay valve 40b, wherein the connection to the service brake outlet 74 at which a relatively low pressure is present is blocked.

Moreover, when the service brake is activated and there is build up in pressure associated therewith at the service brake outlet 74, it is possible for compressed air to pass from the service brake outlet 74 into the spring-loaded brake cylinder outlet 72 via the select high valve 70.

If a higher pressure is present at the service brake outlet 74 than at the outlet 44b of the tractor vehicle control relay valve 40b, the select high valve 70 opens, according to the pressure gradient, a connection between the service brake outlet 74 and the spring-loaded brake cylinder outlet 72.

It is consequently possible to achieve a combined braking effect when the service brake of the tractor vehicle is activated at the service brake outlet 74 in combination with at least one spring-loaded brake cylinder of the tractor vehicle at the spring-loaded brake cylinder outlet 72 by means of the select high valve 70.

A connection of the tractor vehicle control relay valve 40b, in particular its outlet 44b and the select high valve 70, in particular the service brake 74 and/or the spring-loaded brake cylinder outlet 72, to the second control line 41b along the second feedback line 51b can be controlled or monitored by means of the second throttle unit 52b.

The pneumatic connection of the trailer control relay valve 40a and of the tractor vehicle control relay valve 40b are essentially comparable with one another in respect of their basic design.

However, the pneumatic connection of the trailer control outlet line 80a and of the tractor vehicle control outlet line 80b between the trailer and tractor vehicle outlet branches 81a, 81b and the respectively assigned outlets 71, 72, 74 differs.

Therefore, for example according to FIG. 1, the arrangement of the select high valve 70 is provided for connecting the spring-loaded brake cylinder outlet 72 and the service brake outlet 74 to the outlet 44b of the tractor vehicle control relay valve 40b only in conjunction with the pneumatic connection of the tractor vehicle control relay valve 40b.

In addition, the first control solenoid valve unit 20a has a different pneumatic connection than the second control solenoid valve unit 20b.

Therefore, the second control solenoid valve unit 20b according to FIG. 1 has a third control solenoid valve 21b, a venting solenoid valve 22b and a venting outlet 23b.

According to FIG. 1, the venting outlet 23b can be embodied integrated in the venting solenoid valve 22b.

The first control solenoid valve unit 20a in turn has a first control solenoid valve 21a which is comparable with the second control solenoid valve unit 20b and is correspondingly connected in a comparable pneumatic fashion.

However, the second control solenoid valve 22*a* of the first control solenoid valve unit 20*a* and the venting solenoid valve 22*b* of the second control solenoid valve unit 20*b* differ in their design and in their pneumatic connection in the parking brake device 1.

Instead of the venting outlet 23*b* according to the venting solenoid valve 22*b*, the second control solenoid valve 22*a* has a further control port in the form of a bypass control port 22*a*.1.

The second control solenoid valve 22*a* is connected to the tractor vehicle control outlet line 80*b* by means of this bypass control port 22*a*.1, via a bypass control line 41*c*, preferably via the tractor vehicle outlet branch 81*b*.

According to FIG. 1, the tractor vehicle control outlet line 80*b* can be connected at its tractor vehicle outlet branch 81*b* (arranged between the tractor vehicle control relay valve 40*b* and the spring-loaded brake cylinder outlet 72 or the service brake outlet 74) to the first control solenoid valve unit 20*a* by means of the bypass control line 41*c*.

The trailer control outlet line 80*a* can be connected to the tractor vehicle control outlet line 80*b* via the first feedback line 51*a* and the first control line 41*a* on the basis of this additional bypass connection, so that the operating pressure can be applied to the trailer control outlet line 80*a* by the tractor vehicle control outlet line 80*b*.

In addition, in order to set a stepped operating pressure reduction, both the tractor vehicle control outlet line 80*b* and the trailer control outlet line 80*a* can be vented by means of the venting solenoid valve 22*b*.

The method of operation of the parking brake device 1 according to FIG. 1 will be explained below:

In a first parked state or according to a first parking strategy (respective switch positions of the valves as illustrated in FIG. 1), the first and the second control solenoid valves 21*a*; 21*b* are connected in a currentless and pneumatically blocked fashion.

Therefore, compressed air cannot enter the first control line 41*a* or the second control line 41*b* from the compressed air port 10 or from an external compressed air source.

Therefore, there is no feedback in each case present between the respective outlet 44*a*; 44*b* and the respective control inlet 45*a*; 45*b* of the trailer control relay valve 40*a* and tractor vehicle control relay valve 40*b*.

Furthermore only the inlets 43*a*; 43*b* of the trailer control relay valve 40*a* and tractor vehicle control relay valve 40*b* are supplied with compressed air.

Since there is no pressure present at the control inlets 45*a*; 45*b* of the trailer control relay valve 40*a* and tractor vehicle control relay valve 40*b* the respective venting outlets 46*a*; 46*b* thereof are opened.

The first feedback line 51*a* and the second feedback line 52*a* are vented via the venting outlets 46*a*; 46*b* of the trailer control relay valve 40*a* and tractor vehicle control relay valve 40*b*.

By means of the pneumatic connection according to FIG. 1, the first control line 41*a* is also vented via the venting outlet 46*a*, and likewise the second control line 41*b* is vented via the venting outlet 46*b*.

The spring-loaded brake cylinder outlet 72 of the parking brake device for the tractor vehicle and the trailer control outlet 71 for actuating a control inlet of the trailer control valve (each not shown in FIG. 1) are therefore also vented.

The venting of the spring-loaded brake cylinder outlet 72 brings about corresponding venting of the spring compression spaces of the spring-loaded brake cylinders of the vehicle, in response to which the tractor vehicle brake system is activated.

However, the venting of the trailer control outlet 71 causes, owing to the inverse pneumatic actuation of the control inlet of the trailer control valve, the service brake cylinders of the trailer to be supplied with compressed air, so that the trailer is also in a braked parked state.

This first parked state is present in the form of a braked parked state of the trailer, in particular in an at least partially laden state of the trailer.

Such trailers are embodied, e.g. as a trailer-convertor dolly and can be used, for example, to transport elongate material for transportation which is to a certain extent self-supporting, such as tree trunks, beams and bars (made of wood, steel, concrete etc.).

The spring-loaded brake cylinder of the tractor vehicle or the service brake cylinders of the trailer are activated in this way and provide a braking force.

The service brake outlet 74 of the parking brake device 1 for the tractor vehicle is vented in the first parked state. The service brake of the tractor vehicle is released in this way.

In a second parked state or according to a second parking strategy (not illustrated in FIG. 1), the first control solenoid valve 21*a* is energized so that it is changed into an open position.

The second control solenoid valve 21*b* for controlling the parking brake of the tractor vehicle is also connected, as illustrated in FIG. 1, in a currentless and pneumatically blocked fashion.

The open position of the first control solenoid valve 21*a* causes the control inlet 45*a* of the trailer control relay valve 40*a* to be aerated, in response to which the trailer control relay valve 40*a* changes from a blocked position into an open position when a control threshold pressure is reached.

The inlet 43*a* and the outlet 44*a* of the trailer control relay valve 40*a* are consequently connected to one another pneumatically so that compressed air is provided by its inlet 43*a* at its outlet 44*a*.

This provision of compressed air also results in aeration of the first feedback line 51*a*, of the first control line 41*a* and in particular of the trailer control outlet line 80*a*.

As soon as the control inlet 45*a* and the trailer control outlet 71 are sufficiently aerated, the first control solenoid valve 21*a* is switched to a disconnected or closed position.

The stable aeration above the control threshold pressure of the first control inlet 45*a* of the trailer control relay valve 40*a* takes place when the first control solenoid valve 21*a* is now closed, via the first feedback line 51*a* and the operating pressure of the trailer control outlet line 80*a*. The trailer control outlet 71 is therefore aerated.

The aeration of the trailer control outlet 71 caused, by means of the inverse pneumatic actuation of the control limit of the trailer control valve, the service brake cylinders of the trailer not to be supplied with compressed air or vented so that the trailer is an unbraked parked state.

This second parked state of the trailer, which is configured, e.g. as a trailer-convertor dolly in the form of an unbraked parked state, in particular in an unladen state of the trailer.

The spring-loaded brake cylinders of the tractor vehicle are in turn vented as in the first parked state and as result activated and provide a braking force.

Only the service brake cylinders of the trailer are deactivated in this way and do not provide any braking force.

The service brake outlet 74 of the parking brake device 1 for the tractor vehicle is also vented in the second parked state. The service brake of the tractor vehicle is released in this way.

In order to change from the first parked state into a driving state, according to FIG. 1 the first and second control solenoid valves 21a; 21b are energized and switched to an open or transmitting position in contrast to the first parked state.

In order correspondingly to change from the second parked state into a driving state, according to FIG. 1 the first control solenoid valve 21a is not actuated, in contrast with the second parked state, since, as explained above, according to the second parked state it is at least temporarily already switched to an open or transmitting position and the trailer control outlet line 80a is already aerated.

Compressed air is fed into the first and second control lines 41a; 41b through the control solenoid valves 21a; 21b which are now switched to the open position.

The control inlets 45a; 45b of the trailer control relay valve 40a and tractor vehicle control relay valve 40b are aerated via the control lines 41a; 41b.

When a control threshold pressure is reached or exceeded, a connection between the inlet 43a; 43b and the outlet 43a; 43b is respectively established in the relay valves 40a; 40b so that compressed air is provided at the outlets 44a; 44b.

When the control threshold pressure at the control inlets 45a; 45b is reached or exceeded, the venting outlets 46a; 46b of the trailer control relay valve 40a and tractor vehicle control relay valve 40b are closed.

The service pressure which is then present at the outlet 44b of the trailer vehicle control relay valve 40b is passed on, in accordance with the prevailing pressure difference, along the tractor vehicle control outlet line 80b to the spring-loaded brake cylinder outlet 72 via the select high valve 70.

Accordingly, the service brake of the outlet 44a of the trailer control relay valve 40a is also passed on to the trailer control outlet 71.

The spring-loaded brake cylinder outlet 72 and the trailer control outlet 71 are therefore aerated. In this way, the parking brake of the tractor vehicle and the service brake of the trailer are released so that a braking force is not applied and the utility vehicle is in a driving state.

As soon as the spring-loaded brake cylinder outlet 72 and the trailer control outlet 71 are sufficiently aerated, the first and the second control solenoid valves 21a; 21b are switched to a disconnected or closed position.

The stable aeration above the control threshold pressure of the respective control inlets 45a, 45b of the trailer control relay valve 40a and tractor vehicle control relay valve 40b is carried out when the control solenoid valves 21a, 21b are then closed, via the respective first and second feedback lines 51a, 51b and the service pressure of the trailer control outlet line 80a and the tractor vehicle control outlet line 80b.

The trailer control outlet 71 and the spring-loaded brake cylinder outlet 72 are therefore aerated.

The service brake outlet 74 for a tractor vehicle is vented.

In this way, a driving state of the motor vehicle in the form of a utility vehicle, with a tractor vehicle and a trailer, is brought about.

In order to change from a driving state correspondingly into the first parked state, the control solenoid valve 22a and the venting solenoid valve 22b are firstly switched to an open or transmitting position starting from the driving state, so that basically compressed air can escape via the venting outlet 23b.

The service pressure of the first and second control lines 41a, 41b is reduced or vented in conjunction with the control inlets 45a; 45b.

The venting of the second control line 41b then takes place directly via its corresponding port to the venting solenoid valve 22b.

In contrast, the venting of the first control line 41a also takes place via the venting solenoid valve 22b, but the venting path which is correspondingly provided for this purpose is formed by: the second control solenoid valve 22a, the bypass control line 41c, the second feedback line 51b and the first control line 41a.

The respective pneumatic connection between the inlets 43a; 43b and the outlets 44a; 44b of the trailer control relay valve 40a and tractor vehicle control relay valve 40b is disconnected by means of the decreasing pressure in the controlled inlets 45a; 45b.

The venting outlets 46a; 46b of the trailer control relay valve 40a and tractor vehicle control relay valve 40b are opened again.

The service pressure from the second feedback line 51b in conjunction with the tractor vehicle control outlet line 80b and the spring-loaded brake cylinder outlet 72 is then additionally vented via the venting outlet 46b of the tractor vehicle control relay valve 40b.

Furthermore, venting of the tractor vehicle control outlet line 80b and of the spring-loaded brake cylinder outlet 72 takes place via the venting solenoid valve 22b which is switched to the open position, owing to the continuously present feedback via the second feedback line 51b to the second throttle unit 52b.

Moreover, the service pressure from the first feedback line 51a is additionally vented, in conjunction with the trailer control outlet line 80a and the trailer control outlet 71, via the venting outlet 46a of the trailer control relay valve 40a.

At least partial venting of the trailer control outlet line 80a and of the trailer control outlet 71 takes place via the venting valve 22b which has been switched to the open position owing to the continuously present feedback via the first feedback line 51a and via the venting path described above.

As soon as the spring-loaded brake cylinder outlet 72 and the trailer control outlet 71 are sufficiently vented, the second control solenoid valve 22a and the venting solenoid valve 22b are switched to a closed position so that the first parked state is then present.

Therefore, a first parked state according to FIG. 1 with the vented spring-loaded brake cylinder outlet 72 and the vented trailer control outlet 71 is brought about.

The parking brake of the tractor vehicle and of the trailer are activated and apply a corresponding braking effect.

In order to change from a driving state correspondingly into the second parked state, only the venting solenoid valve 22b is switched to the open or transmitting position starting from driving state, so that compressed air can escape via the venting outlet 23b.

The venting of the tractor vehicle control outlet line 80b and of the spring-loaded brake cylinder outlet 72 then takes place in a way comparable to its corresponding venting according to the change described above from a driving state into a first parked state.

In order to change from a driving state into the second parked state, the second control solenoid valve 22a remains in its blocked position so that when the tractor vehicle control outlet line 80b is vented, the trailer control outlet line 80a remains nevertheless in an aerated state, as already described above in relation to the second parked state.

The transfer of the parking brake device 1 according to the invention from the driving state in the first or second parked state can also take place automatically as a function of the load state of the utility vehicle.

The sensing of the load state of the utility vehicle and preferably of the trailer is carried out by means of one or more load sensors.

The load sensors are preferably configured and designed to sense the load state of the trailer, e.g. in the form of a laden weight, laden volume and its respective distribution within the trailer.

A pneumatic connection of the parking brake device 1 according to the second parked state also moreover corresponds to a so-called trailer test state of the parking brake device 1.

Such connection of the parking brake device 1 is carried out independently of the load state of the trailer in response to a corresponding trailer test command of a vehicle driver.

Furthermore, a graduated braking state can also be brought about from the driving state.

The control solenoid valves 21*a*; 21*b*; 22*a* and the venting solenoid valve 22*b* are preferably connected to a partially open or transmitting state, in particular by means of a plurality of short successive pulsed activation operations.

The first and second control lines 41*a*; 41*b* are therefore aerated or vented.

The control inlets 45*a*; 45*a* of the trailer control relay valve 40*a* and tractor vehicle control relay valve 40*b* are aerated with a specific control pressure which is between 0 bar and the maximum system pressure.

The specific control pressure can be set as a function of the degree of opening of the control solenoid valves 21*a*; 21*b*; 22*a* and the venting solenoid valve 22*b*.

Proportional pressures are preferably provided at the outlets 44*a*; 44*b* of the trailer control relay valve 40*a* and tractor vehicle control relay valve 40*b* by means of the specific pressure at the control inlets 45*a*; 45*b*.

The spring-loaded brake cylinder outlet 72 and the trailer control outlet 71 are vented in such a way that a partial braking effect of the tractor vehicle and of the trailer is brought about.

As described above (in relation to the changeover from a driving state correspondingly into the first parked state), stepped venting of the trailer control outlet line 80*a* and of the tractor vehicle control outlet line 80*b* take place together via the venting solenoid valve 22*b* and the correspondingly described venting path.

A graduated braking state with partial braking effect of the motor vehicle can be provided.

In this way, constant pressures can be maintained and changed incrementally over a specific time period at the outlets 44*a*; 44*b* of the trailer control relay valve 40*a* and tractor vehicle control relay valve 40*b*.

Since the spring-loaded brake cylinder outlet 72 and the trailer control outlet 71 are at certain times aerated with constant, incrementally changed pressures, the braking effect of the tractor vehicle and of the trailer can be varied incrementally.

Moreover, it is also possible to implement an anti-jack-knife state with the exemplary embodiment according to FIG. 1, in particular from a driving state.

The switching over into the operating state for the anti-jack-knife function is based essentially on the switching processes described above.

The spring-loaded brake cylinder outlet 72 of the tractor vehicle is preferably aerated in the anti-jack-knife state.

The trailer control outlet 71 can be vented or aerated as required, in particular by means of the tractor vehicle control relay valve 40*b* in conjunction with the first control solenoid valve unit 20*a*.

The trailer control outlet 71 can therefore be expediently aerated with compressed air or vented, in particular in a way which can be graduated.

A braking effect which can be graduated of the trailer is therefore available, in order to extend the motor vehicle during the driving state and in this way stabilize it.

Figure 2:
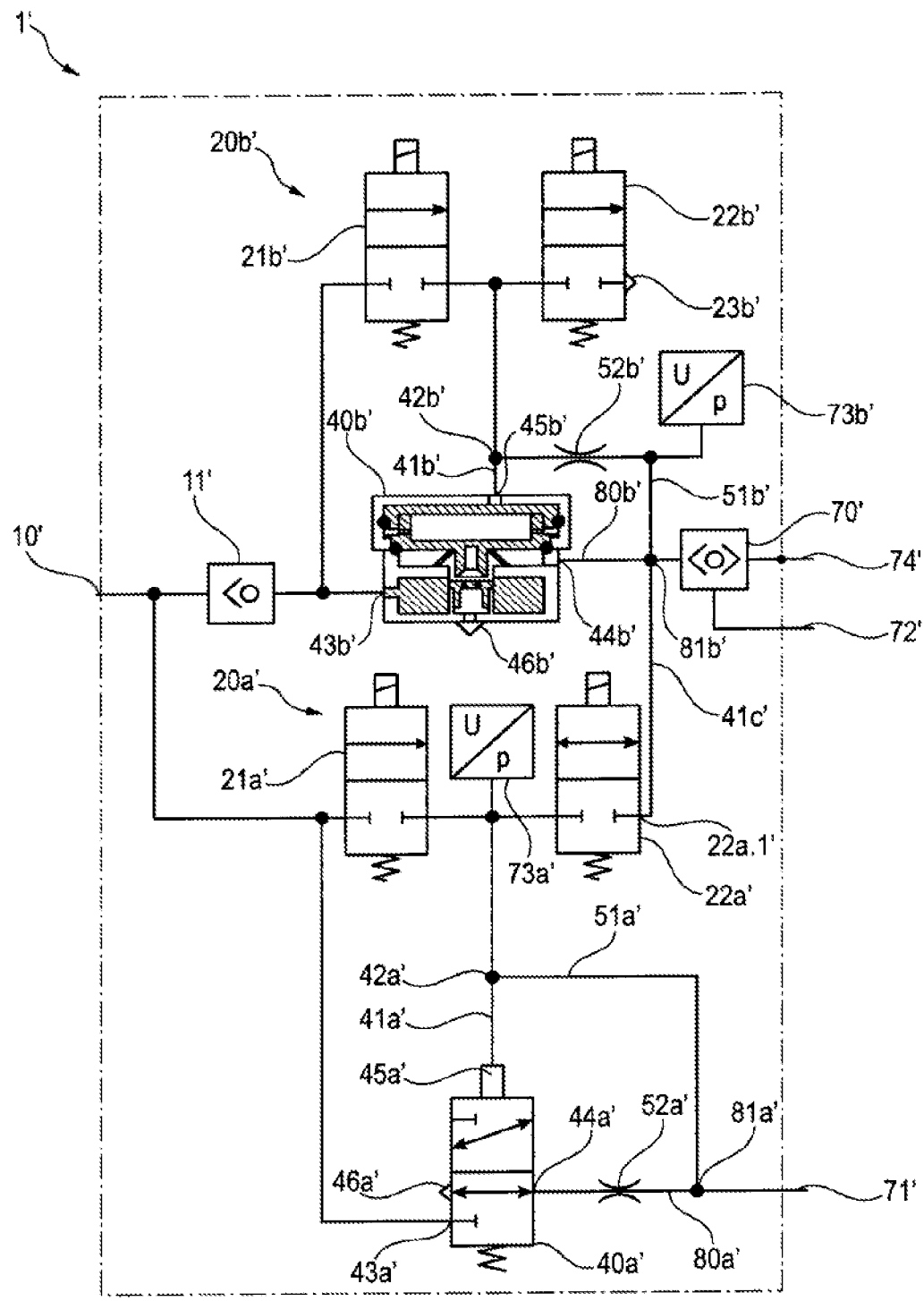
FIG. 2 shows a second exemplary embodiment of a parking brake device according to the invention in a parked state.

The second exemplary embodiment (illustrated in FIG. 2) of the parking brake device 1' according to the invention has essentially the same structural and functional features as the first exemplary embodiment of the parking brake device 1 according to the invention which is described according to FIG. 1.

Only the following, in particular structural, differences in respect of features are to be indicated:

Instead of the trailer control relay valve 40*a*, the second exemplary embodiment of the parking brake device 1' according to the invention has a bistable 3/2-way valve 40*a'*, which can be actuated pneumatically and fed back, for the purpose of performing open-loop and/or closed-loop control of the first trailer control outlet line 80*a*.

LIST OF REFERENCE SYMBOLS

1 Parking brake device
10 Compressed air port
11 Nonreturn valve
20*a* First control solenoid valve unit
20*b* Second control solenoid valve unit
21*a* First control solenoid valve
21*b* Third control solenoid valve
22*a* Second control solenoid valve
22*a*.1 Bypass control port
22*b* Venting solenoid valve
23*b* Venting outlet
40*a* Trailer control relay valve
40*b* Tractor vehicle control relay valve
41*a* First control line
41*b* Second control line
41*c* Bypass control line
42*a* First control branch
42*b* Second control branch
43*a* Inlet of the trailer control relay valve
43*b* Inlet of the tractor vehicle control relay valve
44*a* Outlet of the trailer control relay valve
44*b* Outlet of the tractor vehicle control relay valve
45*a* Control inlet of the trailer control relay valve
45*b* Control inlet of the tractor vehicle control relay valve
46*a* Venting outlet of the trailer control relay valve
46*b* Venting outlet of the tractor vehicle control relay valve
51*a* First feedback line
51*b* Second feedback line
52*a* First throttle unit
52*b* Second throttle unit
70 Select high valve
71 Trailer control outlet
72 Spring-loaded brake cylinder outlet
73*a* First pressure sensor
73*b* Second pressure sensor
74 Service brake outlet
80*a* Trailer control outlet line
80*b* Tractor vehicle control outlet line
81*a* Trailer outlet branch
81*b* Tractor vehicle outlet branch
1' Parking brake device
10' Compressed air port
11 Nonreturn valve 20a' First control solenoid valve unit
20b' Second control solenoid valve unit
21a' First control solenoid valve
21b' Third control solenoid valve
22a' Second control solenoid valve
22a.1' Bypass control port
22b' Venting solenoid valve
23b' Venting outlet
40a' Bistable 3/2-way valve
40b' Tractor vehicle control relay valve
41a' First control line
41b' Second control line
41c' Bypass control line
42a' First control branch
42b' Second control branch
43a' Inlet of the bistable 3/2-way valve
43b' Inlet of the tractor vehicle control relay valve
44a' Outlet of the bistable 3/2-way valve
44b' Outlet of the tractor vehicle control relay valve
45a' Control inlet of the bistable 3/2-way valve
45b' Control inlet of the tractor vehicle control relay valve
46a' Venting outlet of the bistable 3/2-way valve
46b' Venting outlet of the tractor vehicle control relay valve
51a' First feedback line
51b' Second feedback line
52a' First throttle unit
52b' Second throttle unit
70 Select high valve
71' Trailer control outlet
72' Spring-loaded brake cylinder outlet
73a' First pressure sensor
73b' Second pressure sensor
74 Service brake outlet
80a' Trailer control outlet line
80b' Tractor vehicle control outlet line 81a' Trailer outlet branch 81b' Tractor vehicle outlet branch

What is claimed is:

1. A parking brake device for a motor vehicle, comprising:
at least one compressed air port;
at least one first control solenoid valve unit;
at least one trailer control bistable valve; and
at least one first compressed air outlet,
wherein the compressed air port is connectable to the first control solenoid valve unit and to the trailer control bistable valve,
wherein the first control solenoid valve unit is connectable to the trailer control bistable valve via at least one first control line, and wherein the trailer control bistable valve is connectable to the first compressed air outlet via at least one trailer control outlet line,
at least one tractor vehicle control bistable valve; and
at least one second compressed air outlet,
wherein the compressed air port is connectable to the tractor vehicle control bistable valve, and wherein the tractor vehicle control bistable valve is connectable to the second compressed air outlet via at least one tractor vehicle control outlet line,
wherein at least one tractor vehicle outlet branch is arranged in the tractor vehicle control outlet line, between the tractor vehicle control bistable valve and the second compressed air outlet, and
wherein the first control solenoid valve unit is connectable to the tractor vehicle control outlet line via at least one bypass control line and via the tractor vehicle outlet branch,
wherein
the first control solenoid valve unit has at least one first control solenoid valve and at least one second control solenoid valve, and
at least one pressure sensor is arranged in a connecting line between the first and second control solenoid valves.

2. The parking brake device as claimed in claim 1, wherein
the first control solenoid valve unit is configured in such a way that the first control solenoid valve is arranged between the compressed air port and the first control line, and the second control solenoid valve is arranged between the first control line and the bypass control line.

3. The parking brake device as claimed in claim 1, wherein
at least one first control branch is arranged in the first control line, between the trailer control bistable valve and the first control solenoid valve unit,
at least one trailer outlet branch is arranged in the trailer control outlet line, between the trailer control bistable valve and the first compressed air outlet, and
the first control line is connected to the trailer control outlet line at the first control branch via at least one first feedback line at the trailer outlet branch.

4. The parking brake device as claimed in claim 3, wherein
at least one first throttle unit is arrangeable in the trailer control outlet line, wherein the first throttle unit is arranged between the trailer control bistable valve and the trailer outlet branch, and/or wherein the first throttle unit is arrangeable in the first feedback line.

5. The parking brake device as claimed in claim 3, wherein
the first feedback line forms, in conjunction with the first control branch and the trailer outlet branch, a feedback connection between a first control inlet and a first outlet of the trailer control bistable valve.

6. The parking brake device as claimed in claim 1, wherein
the parking brake device has at least one second control solenoid valve unit which is connectable to the compressed air port and to the tractor vehicle control bistable valve, and
the second control solenoid valve unit is connectable to the tractor vehicle control bistable valve via at least one second control line.

7. The parking brake device as claimed in claim 6, wherein
at least a second control branch is arranged in the second control line, between the tractor vehicle control bistable valve and the second control solenoid valve unit, and
the second control line is connected to the tractor vehicle control outlet line at the second control branch, via at least one second feedback line at the tractor vehicle outlet branch.

8. The parking brake device as claimed in claim 6, wherein
the parking brake device has at least one second throttle unit which is arranged in the second feedback line, between the tractor vehicle outlet branch of the tractor vehicle control outlet line and the second control branch of the second control line.

9. The parking brake device as claimed in claim 6, wherein the second control solenoid valve unit has at least one third control solenoid valve and at least one venting solenoid valve with at least one venting outlet.

10. The parking brake device as claimed in claim 9, wherein
the second control solenoid valve unit is configured in such a way that the third control solenoid valve is arranged between the compressed air port and the second control line, and
the venting solenoid valve is arranged between the second control line and the venting outlet.

11. The parking brake device as claimed in claim 7, wherein
the second feedback line forms, in conjunction with the second control branch and the tractor vehicle outlet branch, a feedback connection, via the second throttle unit, between a control inlet and an outlet of the tractor vehicle control bistable valve.

12. The parking brake device as claimed in claim 1, wherein
the tractor vehicle control bistable valve is embodied as a tractor vehicle control relay valve, and/or
the trailer control bistable valve is embodied as a trailer control relay valve or as a 3/2-way valve which is actuated pneumatically.

13. The parking brake device as claimed in claim 1, wherein
the parking brake device is a utility vehicle parking brake device.

14. The parking brake device of claim 1 wherein the trailer control bistable valve comprises an inlet, a working outlet, a control inlet, and a venting outlet.

* * * * *